May 27, 1969 E. R. GEIS 3,447,050
RATIO CONTROL SYSTEM
Filed Oct. 5, 1965 Sheet 1 of 4

INVENTOR
Everett R. Geis
BY James J. Jennings, Jr.
ATTORNEY

May 27, 1969  E. R. GEIS  3,447,050
RATIO CONTROL SYSTEM
Filed Oct. 5, 1965

Fig 2

INVENTOR
Everett R. Geis
BY James J. Jennings, Jr.
ATTORNEY

INVENTOR
Everett R. Geis
BY James J. Jennings Jr.
ATTORNEY

United States Patent Office 3,447,050
Patented May 27, 1969

3,447,050
RATIO CONTROL SYSTEM
Everett R. Geis, Orange, Calif., assignor to Borg-Warner Corporation, Chicago, Ill., a corporation of Illinois
Filed Oct. 5, 1965, Ser. No. 493,089
Int. Cl. H02p 7/06, 11/00
U.S. Cl. 318—67
13 Claims

ABSTRACT OF THE DISCLOSURE

Different A-C motors are operated at the different speeds corresponding to the different frequencies of output voltages provided by respective different inverters. The different frequencies have a common reference provided by the output signal of a master oscillator. A draw control system includes a plurality of control stages each coupled between the master oscillator and one of the function channels in which one or more of the A-C motors is connected. In each draw control stage a counter accumulates timing pulses from the master oscillator and the accumulated digital count is continuously converted to an analog voltage. A comparator receives a portion of this analog voltage, and also receives a reference voltage determined by a reference element in the preceding draw control stage. Output signals from the comparator regulate the frequency of inverter operation in that function channel and thus determine the speed of the associated A-C motor both as a function of the timing signals received from the master oscillator and as a function of the reference voltage received from the adjacent draw control stage. The count accumulated from the master oscillator is also stored in a memory circuit in each draw control stage and periodically converted into an analog signal for application across a reference component which is adjusted to pass the reference voltage to the succeeding draw control stage.

Background of the invention

Various industries require the precise control of motors at different speeds in continuous process manufacturing. Such industries include the textile (particularly the synthetic fibers), plastic film, paper, and other industries where a strand or web of material is processed from a supply point through various stages to the finished product. To control or modify some characteristic of the strand or web of material, such as its thickness or finish, the motor at one station can be driven at a precisely regulated speed slightly greater than the similarly regulated speed at the preceding station. This difference in speeds is generally described as the ratio of the speed at the one station to the speed of the motor at the preceding station, and is termed the "draw ratio." In this example, the draw ratio is said to be "positive," connoting a higher speed at the one station than at the preceding station. Because it is an accepted term in this art, "positive draw ratio" will be used herein and in the appended claims to describe a speed ratio greater than unity. By way of example, if the motor at one station were operated at 105 cycles per second (c.p.s.) and the preceding station were driven at 100 c.p.s. this actual speed ratio of 1.05 is termed a "positive five percent draw" ratio. In an analogous manner, if the one station were driven at 97 c.p.s. and the preceding station operated at 100 c.p.s., this actual speed ratio of 0.97 is termed a "negative three percent draw" ratio. Such negative draw may be utilized between stations where there is a precisely regulated heating of the strand or web of material to produce a closely controlled amount of shrinkage.

Such systems have been provided and the requisite speed ratios for all the stations have been obtained with a common master oscillator or source of clock pulses, which master unit feeds the pulses to separate digital countdown units (one at each processing station. In its turn the digital countdown unit regulates the frequency of operation of a static inverter which drives the motor at that station at a rate which is a function of the master oscillator frequency and of the setting on the digital countdown unit. Manifestly the motor speed at any station can be regulated by adjusting the count of the digital countdown unit, that is, by changing the number of input pulses which must be received from the master oscillator before an output or control pulse is passed to the associated inverter. With this system the speed ratio between adjacent stages can be changed by changing the speed of operation at any station, but this speed change operation has the consequence of simultaneously changing the draw ratios at all the succeeding or downstream stations, which may be an undesirable effect in a particular system. During system operation it may be desired to change the draw ratio between two adjacent stations by a very small increment without altering the draw ratios between the other stations. To date this has not been possible in an open loop electronic control system without disturbing the previously established draw ratios at the other downstream stations and it is toward this end that the present invention is directed.

Summary of the invention

In its broader aspects, the present invention may be used in any system for supplying periodic energy to a plurality of electrical loads, with the energy supplied to the different loads having different periods. "Periodic energy" includes both alternating energy in which the frequency of alternation determines the time period, or energy translated by passage of unidirectional pulses in which either the pulse width (time duration of the pulse) or the repetition rate of the pulses determines the time period. The system includes a master unit such as an oscillator for establishing a reference time period or a reference frequency by providing timing pulses (either A-C or D-C) at a given periodicity. A salient feature of the invention is the incorporation of a novel period ratio control system which includes a plurality of control stages individually coupled to the different loads. The timing pulses from the master unit are applied to each of the control stages, thus establishing the common reference. The system also includes a period ratio adjusting means for presetting a desired ratio between a first period corresponding to the period of the output signals from a first control stage and a second period corresponding to the period of the output signals from a second one of the control stages. Comparator means is also provided for receiving two input signals, one of which input signals is a function of the first period and the other of which input signals is a function of the second period. One of these two input signals is modified to reflect the setting of the period ratio adjusting means. The output signal from the comparator means is utilized, in conjunction with other components, to regulate the period of the output signals from either of the first and second control stages to maintain the preset period ratio.

The present invention finds utility in a system which includes a plurality of processing stations operated by a like plurality of electrical loads or motors, each of which is driven at a different frequency. System synchronization is provided by a master source of timing pulses which determines the reference frequency for the system. In accordance with the present invention, a draw control system is provided which includes a plurality of draw ratio control stages for receiving the control pulses from the master source and regulating the speed of its associated motor. A significant improvement is obtained by providing draw control means in at least one stage for maintaining the preset draw ratio between that stage and the next successive stage. If the speed of any motor in the system is changed, the preset ratio is still maintained automatically by increasing or decreasing the motor speed at one of those two stages to maintain the preset ratio.

*The drawings*

To enable those skilled in the art to practice the invention, the best mode contemplated for making and using the invention will be set forth in connection with the accompanying drawings, in the several figures of which like reference numerals identify like elements and in which.

*General system arrangement*

Figure 1:
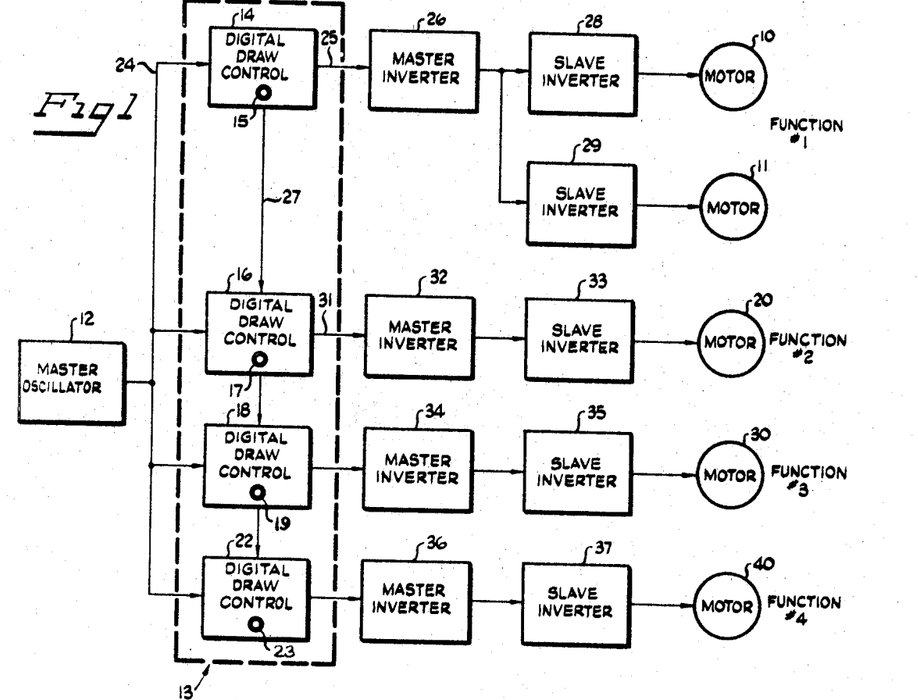
FIGURE 1 is a block diagram indicating the positioning of the present invention in a motor control system.

FIGURE 1 shows a control arrangement for regulating the speeds of motors placed at four different processing stations, referenced as "functions" in the drawing. Those skilled in the art will appreciate that more or fewer functions can be regulated in accordance with the inventive structure and principles. Two motors 10 and 11 are shown operating at the same speed at processing station 1 or function 1; another motor 20 is positioned at function 2 and operates at a different speed; at function 3 a motor 30 is provided for regulation at another speed; and a motor 40 is driven at still another speed at processing station or function 4. All of these motor speeds are based upon a common reference, which in the illustrated system is provided by the frequency of the output pulses from master oscillator 12. The master oscillator 12 passes the output or timing pulses to a digitial draw control system 13, which includes four separate digital draw control stages 14, 16, 18 and 22. Each of these draw control stages includes a control for regulating the draw ratio between the motor(s) associated with that stage and the motor(s) of the succeeding stage. That is, digital draw control stage 14 includes a control knob 15 for regulating the draw or speed ratio between motors 10 and 11 and motor 20; stage 16 includes a control 17 for regulating the draw ratio between motors 20 and 30; and draw control stage 18 includes a control 19 for regulating the draw ratio between motors 30 and 40. Because there is no fifth function the control unit 23 in stage 22 is ineffective and need not be provided on that unit; in the interest of standardization such a control is provided on every draw control stage.

At the first process station digital draw control stage 14 receives timing pulses over conductor 24 and passes output pulses over conductor 25 to master inverter 26. A reference signal is also applied over conductor 27 to the digital draw control stage 16 at the second function location, as will be explained in more detail hereinafter. The output signal from master inverter 26 regulates the operating sequence for each of the slave inverters 28 and 29, thus correspondingly regulating the speeds of motors 10 and 11. The first function could include only a single slave inverter 28 and motor 10, or could include slave inverters and motors in addition to inverters 28 and 29 and motors 10 and 11. This is also true of the other processing or function stations in the system.

At function 2, digital draw control stage 16 receives timing pulses over conductor 24 and a reference signal over conductor 27. Stage 16 provides output pulses over conductor 31 at a rate which is a function both of the timing pulses received over conductor 24 and of the reference signal received over conductor 27 from the first draw control stage 14. This output signal on conductor 31 regulates the frequency of operation of master inverter 32, correspondingly controlling the operating frequency of slave inverter 33 and motor 20. In a similar manner, master inverter 34 and slave inverter 35 in the third function channel, and master inverter 36 and slave inverter 37 in the fourth function channel, have their operating frequencies regulated to correspondingly govern the speeds of motors 30 and 40.

*General arrangement of the invention*

Figure 2:
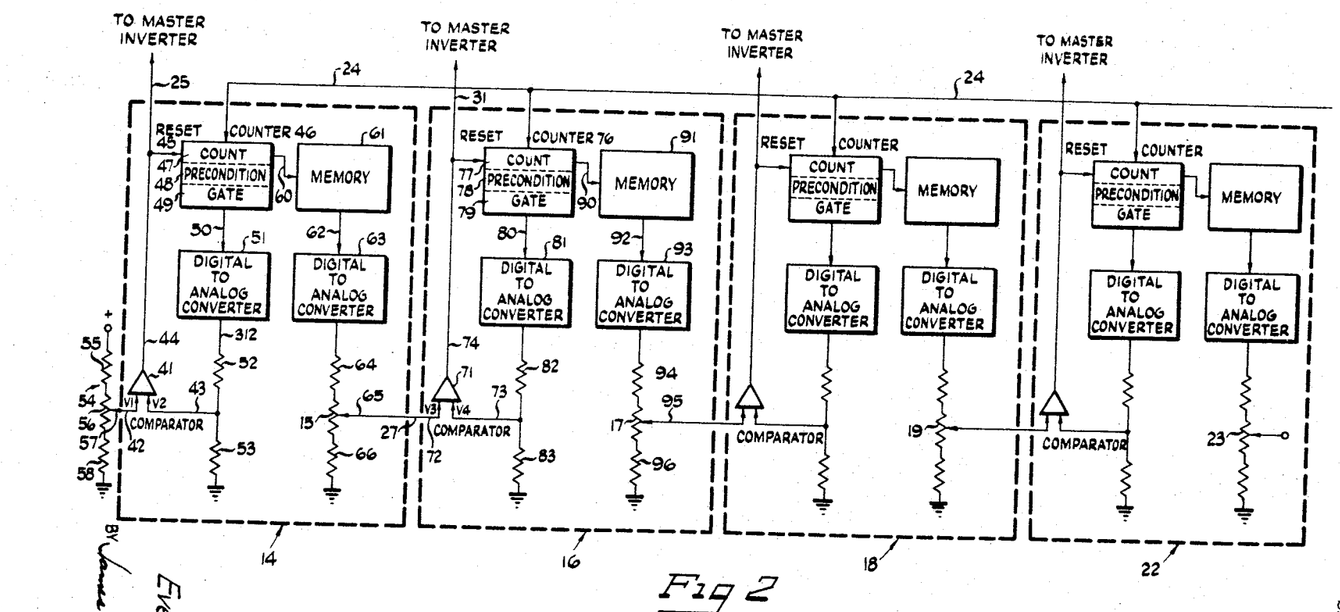
FIGURE 2 is a block diagram, partly in schematic form, depicting generally the inventive arrangement.

Considering now the showing in FIGURE 2, in the left hand portion of this figure, digital draw control stage 14 is depicted. This stage includes a comparator unit 41, including an input conductor 42 over which a first voltage V1 is received and a second input conductor 43 over which another input voltage V2 is received; an output signal is provided over conductor 44 when comparator 41 detects equality between V1 and V2. The equality-denoting output signal is passed over conductors 44, 25 to the master inverter 26, and over conductors 44, 45 to apply a reset signal to a counter stage 46. Three separate circuit arrangements are contained within counter 46; they include a count circuit 47, similar to a binary counting chain; a precondition circuit 48 for effecting virtually instantaneous operation of the count circuit 47 as each pulse is received over conductor 24; and a gate circuit 49 which functions as an output channel for translating information over a plurality of conductors, referenced by the line 50, to digital-to-analog (D/A) converter 51. The output signal from D/A converter 51 is applied across the series circuit including resistors 52 and 53, coupled between converter 51 and a point of reference potential conventionally designated ground. Conductor 43 is coupled to the junction between resistors 52 and 53. The level of voltage V2 appearing on conductor 43 is a function of the voltage output level from D/A converter 51 and of the respective resistance values of resistors 52 and 53. If these resistors are selected to be of equal value, as will be assumed for purposes of explanation, the amplitude of voltage V2 is half the amplitude of the voltage output of D/A converter 51.

The amplitude of the other comparator input voltage V1 is determined by a voltage dividing network 54 which includes a series circuit comprising a resistor 55, a potentiometer 56 having a movable tap 57 coupled to conductor 42, and a resistor 58. Thus the amplitude of voltage V1 is a function of the potential difference applied across voltage divider network 54 and of the setting of movable arm 57. In certain applications the voltage divider networks 54 may include only a fixed resistance (similar to resistors 52 and 53), with the conductor 42 coupled to an intermediate point of this resistance network to maintain the level of voltage V1 constant at a reference level and thus operate the first function at a base or reference speed.

One output connection from count circuit 47 in counter stage 46 is coupled over a line 60 to a memory unit 61 for establishing in memory unit 61 a count signifying the number of pulses passed over conductor 24 to counter 46 before comparator 41 recognizes equality between voltages V1 and V2. This number-denoting signal is passed from memory unit 61 over a plurality of conductors represented by line 62 to D/A converter 63, operative to translate this number-denoting signal into a related voltage amplitude signal. This analog signal is applied across the voltage divider circuit including a resistor 64, a potentiometer 15 which includes a movable arm 65, and a resistor 66. Accordingly the level of the voltage appearing on conductor 27 is a function both of the amplitude of the output voltage provided by D/A converter 63, the respective values of resistors 64, 66 and potentiometer 15, and the setting of arm 65.

Figure 3:
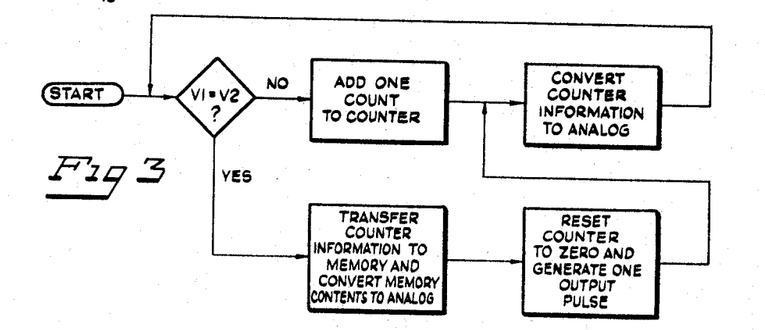
FIGURE 3 is a block diagram indicating in flow chart arrangement the sequence of operations at a given draw control stage.

Considering FIGURE 3 in connection with the showing of FIGURE 2, comparator stage 41 continually examines the voltage input signals V1 and V2 on conductors 42 and 43 to sense equality between these voltage levels. As long as there is no equality, counter 46 is operative to accumulate timing pulses received over conductor 24 from the master oscillator. After each pulse is received in counter 46 and added in count circuit 47, this information is passed through the gate circuit 49 to D/A converter 51, providing an analog output voltage. The amplitude of the output voltage pulse from converter 51 thus increases incrementally as each successive timing pulse is received over conductor 24. It is emphasized that the output of converter 51 is a series or train of pulses of gradually increasing amplitude, and of a duration sufficient for comparator 41 to sense voltage V2 (which is one-half the amplitude of the output pulse from converter 51).

Depending upon the preset level of voltage V1, at some time a sufficient number of input pulses will be received over conductor 24, converted to an analog voltage pulse in D/A converter 51, and applied across resistors 52, 53 so that voltage V2 will equal voltage V1. At this time comparator 41 produces an output pulse and passes this pulse over conductors 44, 45 to count circuit 47 within counter stage 46; the effect of this pulse is to transfer information over line 60 to memory 61, which information represents the total number of pulses passed over line 24 to count circuit 47. Count circuit 47 is reset to zero, and an output pulse is also provided over conductor 25 to regulate the frequency of operation of the associated master inverter and thus of the motor(s) at the first processing stage. The D/A converter 63, upon receiving a numerical signal from memory 61, provides an analog voltage at its output side indicative of the number stored in memory 61. Thus converter 63 provides a constant D-C output voltage related to the number of pulses accumulated in counter 46 before comparator 41 detects equality between voltages V1 and V2. Thus by adjusting the position of arm 65, the level of the voltage V3 applied over conductor 27 and input conductor 72 to comparator stage 71 will be varied. From the foregoing explanation, it is evident that potentiometer 15 thus provides a draw ratio control between stages 14 and 16, in that the timing pulses received by counter stage 76 in stage 16 are at the same frequency as those received by counter 46 in stage 14, and the time in which voltage V3 will equal voltage V4 will depend upon the setting of arm 65. In draw control stage 16, counter 76 also includes a count circuit 77, a precondition circuit 78, and a gate circuit 79 for applying output information over line 80 to D/A converter 81. The output voltage from converter 81 is applied across a voltage divider arrangement including resistors 82 and 83, and a conductor 73 is coupled to the common connection between resistors 82, 83 to apply voltage V4 to comparator 71. In a related manner count circuit 77 is coupled over line 90 to memory circuit 91, in its turn coupled over line 92 to D/A converter 93. The constant D-C output voltage from converter 93 is dropped across the voltage divider arrangement including resistor 94, potentiometer 17 which has an adjustable arm 95, and resistor 96. It is thus manifest that adjustment of the position of arm 95 correspondingly governs the draw ratio between stages 16 and 18, regulating the ratio of motor speeds between the second and third functions.

Comparator, counter and memory stages

Figure 4:
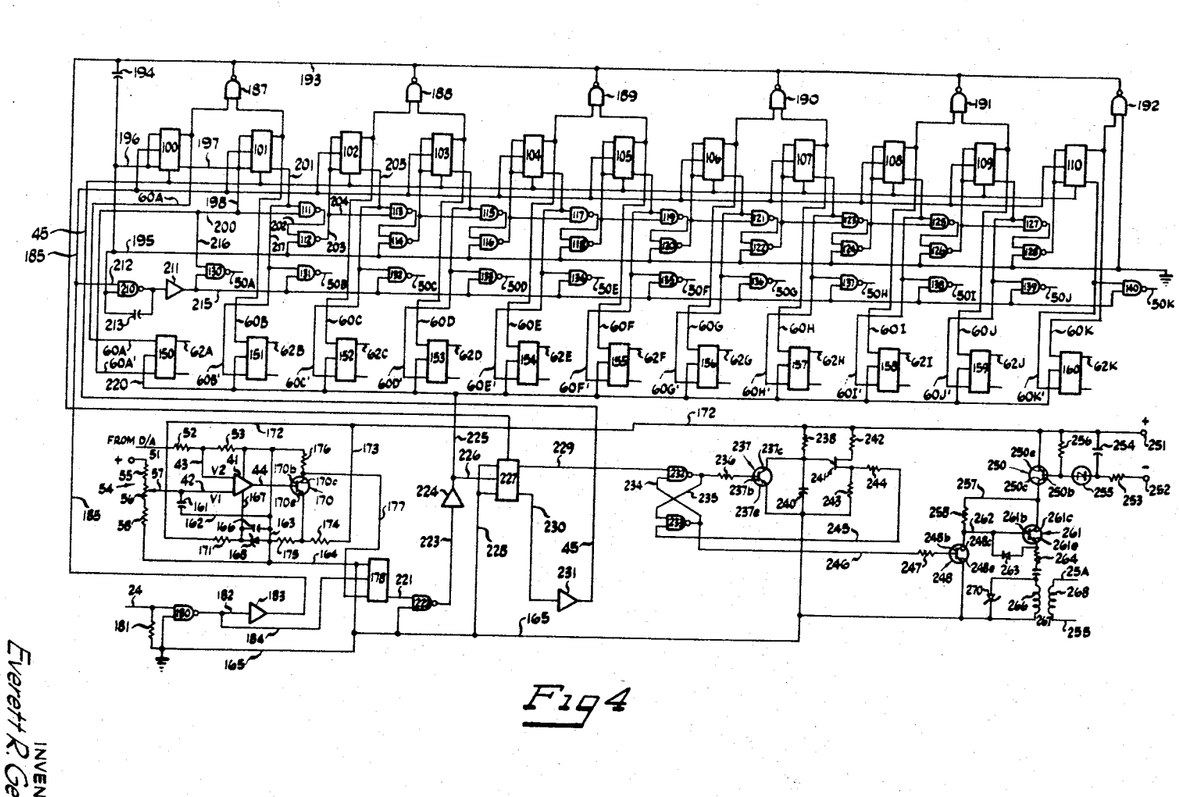
FIGURE 4 is a block diagram, partly in schematic form, illustrating in more detail the arrangement of the comparator, counter, and memory units shown generally in FIGURE 2.

Considering now FIGURE 4, in the uppermost portion of this diagram stages 100–110 represent the main portions of count circuit 47 in counter 46. The precondition circuit 48 of counter 46 includes the stages referenced 111–128 below the count circuit, and gate circuit 49 shown generally in FIGURE 2 includes the stages referenced 130–140 in FIGURE 4, just below precondition stages 111–128. Memory arrangement 61 of FIGURE 2 includes the stages 150–160 in the central portion of FIGURE 4, and comparator stage 41 is shown in the lower left portion of FIGURE 4.

Considering first comparator stage 41, the input circuit 52, 53 for receiving the voltage pulses provided by D/A converter 51 is shown, as is the voltage divider circuit 54. Capacitor 161 has one plate coupled to conductor 42 and the other plate coupled over conductors 162, 163, 164 and 165 to ground. Capacitor 161 functions as a high frequency noise filter in the circuit.

Another capacitor 166 is shown coupled between conductors 167 and 163, and a Zener diode 168 is coupled in parallel with capacitor 166. This Zener diode is utilized to provide an appropriate voltage level in the composite circuit including transistor 170, and in that such diodes are noise generators, the parallel connection of capacitor 166 serves to short out most of the high frequency noise.

The cathode of Zener diode 168 is coupled over a resistor 171, conductors 172, 173 and resistor 174 to the emitter 170e of transistor 170. Another resistor 175 is coupled between conductor 163 and emitter 170e. A dropping resistor 176 is coupled between collector 170c and conductor 163. Base 170b of transistor 170 is coupled to the output conductor 44 of comparator stage 41. From the common connection between resistor 176 and collector 170c, conductor 177 extends to the lowermost input connection of a switching stage 178. The uppermost input connection of stage 178 is coupled to conductors 164 and 165.

Conductor 24 over which the timing signals are applied is coupled to one input connection of an inverter gate 180, the other input connection of which is coupled to ground. Resistor 181, coupled between conductor 24 and ground, provides an impedance match with the coaxial cable generally used as conductor 24. The output side of inverter gate 180 is coupled over conductor 182 to a power inverter stage 183, and is also coupled over another conductor 184 to the trigger input connection of flip-flop or bistable stage 178. Although clock pulses are thus applied to the trigger input connection of stage 178, the flip-flop stage 178 will not respond and provide an output pulse until the appropriate conditioning signal is received over conductor 177 from transistor 170 and comparator 41. Upon receipt of this conditioning signal over conductor 177, flip-flop stage 178 operates to change its state upon receipt of the next clock pulse signal over conductor 184.

The conditioning signal received over conductor 177 is provided when transistor 170 changes its state as an output signal is provided from comparator stage 41. When the comparator stage 41 detects equality between voltages V1 and V2, the comparator output voltage on conductor 44 rapidly rises. The magnitude of this rise in one embodiment, was approximately from 7 volts to 20 volts. In the subsequent portion of the system it is desirable to have voltage changes of a lesser level (that is, less than a 13 volt change). To this end the voltage on conductor 44 is utilized to rapidly turn off transistors 170, which alters the relative connections of resistors 174, 175 and 176 in the illustrated voltage divider arrangement. With these three resistors of equal value, which was 1000 ohms in one embodiment, and a potential 20 volts positive with respect to ground provided over conductors 172, 173, the potential on conductor 177 was approximately plus seven volts before turn-off of transistor 170. After this transistor is turned off the voltage on conductor 177 rapidly goes to ground or zero level to condition flip-flop stage 178 for the proper operation. It is noted, however, that notwithstanding the condition of switching stage 178, the pulses received over conductor 24 are continually passed through inverter gate stage 180, over conductor 182 and power inverter 183, and thence over conductor 185 to the trigger or counting input connection of each of the flip-flop count stages 100–110 within count circuit 47 of counter 46.

Considering the binary counter circuit including flip-flop stages 100–110 in the upper portion of FIGURE 4, those skilled in the art will appreciate that counting pulses are continually applied over conductor 185, and reset pulses can be applied over conductor 45, to provide a conventional binary counting circuit. For the moment the six "not and" or nand circuits 187–192, their common output connections over conductor 193, and capacitor 194 coupled between conductor 193 and ground conductor 195, will be ignored. With the first counting pulse applied over conductor 185, the state of stage 100 is changed (from logic zero to logic one) and upon receipt of the next pulse, the state of stage 100 is returned to its initial state (logic zero) as the state of stage 101 is changed (from logic zero to logic one). This action continues in a well-known manner with receipt over conductor 185 of each successive input counting pulse. Thus with all of the flip-flop stages 100–109 changed to the logic one condition but stage 110 still in the logic zero state, receipt of the next pulse over conductor 185 will effect the change of state of stage 100, and of each of the other stages 101–109, to consequently alter the state of stage 110. However, this "ripple" type operation is undesirable in that the individual time periods for operation of each stage are cumulated to register the last count in the binary counting circuit 100–110. Accordingly the precondition circuit 48 including the stages 111–128 in FIGURE 4 is provided to minimize the "ripple" type delay or obviate the cumulation of switching times, to thus maintain the total circuit operating time at a minimum duration as the higher order counts are accumulated.

Each of the flip-flop counting stages 100–110 is of the type that is changed from the logic zero to the logic one state upon receipt of a count pulse over conductor 185 applied to the trigger input terminal of the stage, provided that such stage has been conditioned by application of a ground or low potential over the upper and lower input conductors. In flip-flop stage 100, by way of example, the upper and lower input conductors are coupled over conductor 196 to the ground conductor 195, thus conditioning the first (binary one) stage for operation as each impulse is received over conductor 185. Each time the first (binary one) stage 100 is actuated from the logic zero to the logic one condition, its upper output terminal goes to the one or high voltage condition and its lower output terminal goes to the low or zero condition, and this low voltage signal is applied over conductor 197 to condition the next (binary two) stage 101 for operation. Thus there is no need for preconditioning the 2 stage in that it is always preconditioned immediately upon operation of the first stage 100. However, for the binary 4 stage 102, ordinarily this stage would have to wait until the 1 and 2 stages 100 and 101 were switched off and this stage switched on, and thus the first part of the preconditioning circuit including stages 111 and 112 is utilized to obviate the time delay for operation of the third counting stage 102.

When a count of three has been accumulated in the counter, each of stages 100 and 101 is in the logic one condition with a low voltage at the lower right hand output terminal. The low voltage at the zero output terminal of stage 100 is applied over conductors 197, 198 and 200 to the lower input terminal of stage 111, which co-operates with stage 112 as a dual gate. Thus stage 111 is "told" that stage 100 is in the logic one condition, indicating a count of 1. At the same time the logic zero or low output voltage signal from stage 101 is applied over conductor 201 to the upper input terminal of stage 111. Accordingly stage 111 is also "told" that the binary 2 counting stage 101 is in the logic one condition, so that the counting chain indicates a total of three. Of course the simultaneous appearance of signals on conductors 200 and 201 also means that receipt of the next counting pulse will register a total count of 4, which means that stage 102 should be switched to the logic one condition and stages 100 and 101 should be returned to logic zero. To obviate the delay time usually needed for switching of stages 100 and 101, the simultaneous presence of the signals from conductors 200, 201 is effective through stage 111 to provide a high level signal on its output conductor 202, which signal is applied to the upper input connection of stage 112. The lower input connection of stage 112 is coupled to ground conductor 195. With receipt of the high level signal on conductor 202, indicating that the next counting pulse should switch the condition of stage 102 (the binary 4 stage), the voltage output level from stage 112 is pulled down and this low voltage is applied over conductor 203 to the upper and lower input terminals of stage 102 to condition this stage for operation upon receipt of the next counting pulse over conductor 185. It is noted that this conditioning signal from stage 112 is also applied over conductor 204 to the lower input connection of stage 113 so that, after the next (fourth) counting pulse has changed the condition of stage 102 and stages 100 and 101 have again been operated to logic one by receipt of the fifth, sixth and seventh pulses to accumulate a total count of 7, stages 113 and 114 will cooperate in a manner similar to that just described in connection with stages 111 and 112 to condition binary 8 stage 103 for operation with receipt of the next or eighth counting signal without waiting for the time delays attendant upon sequential operation of stages 100, 101 and 102. From this explanation the interconnection and cooperation of the precondition stages 111–128 in conjunction with the counting chain stages 100–110 will be readily apparent to those skilled in the art.

Just above the first stage 150 of the memory unit, a pair of inverter stages 210 and 211 are shown. Counting pulses received over conductor 185 are applied over conductor 212 to the upper input connection of stage 210, and ground conductor 195 is coupled to the other input connection of this stage and to one plate of a capacitor 213, the other plate of which is coupled to the conductor 214 which passes the output signal from stage 210 to the input side of stage 211. The output connection from inverter 211 extends over conductor 215 to the lower input connection of each of stages 130–140 in the gate circuit 49 (FIGURE 2) which passes information from counter 46 to D/A converter 51. Capacitor 213 assists in filtering out ringing from this circuit. The cumulative delay of inverter stages 210 and 211, although slight, serves to insure that the count circuit 100–110 responds earlier than the time at which the output gating signal is applied over conductor 215. The upper input connections in each of gate stages 130–140 are respectively connected to the logic zero or lower right output connections of the counting stages 100–110. More specifically, the lower right output connection of stage 100 is coupled over conductors 197, 198, 200 and 216 to the upper input connection of first gate stage 130; the lower right output connection of stage 101 is coupled over conductors 201 and 217 to the upper right input connection of stage 131; and so on for the remainder of count stages 102–110 and the associated gate stages 132–140, respectively. Thus each time a gating signal is provided over conductor 215 to all the gate stages 130–140, a signal is passed over the conductors referenced 50A–50K (represented by the single line 50 in FIGURE 2) to the associated digital-to-analog converter 51. In this way D/A converter 51 is always effective to provide an output signal related to the instantaneous count cumulated in counter stages 100–110.

It is thus apparent how the count circuit 100–110, represented by the numeral 47 in FIGURE 2, continually passes a digital indication over line 50 to D/A converter 51, with each pulse passed over line 50 indicating one higher count as each successive pulse is received over conductor 24 until the reset pulse is applied over conductor 45. Even though the D/A converter 51 thus receives a gradually increasing count, it is again noted that the count circuit 47 is not operable to pass any information over line 60 to memory unit 61 until equality between voltages V1 and V2 at comparator 41 is affirmed. This operation will now be explained in conjunction with FIGURE 4.

The memory circuit 61 of FIGURE 2 includes the individual flip-flop stages 150–160 in FIGURE 4, and each of these stages is individually coupled to an associated one of the binary counting stages 100–110. For example, the upper output connection of counting stage 100 is coupled over conductor 60A to the upper input connection of memory stage 150, and the lower output connection of counting stage 100 is coupled over conductors 197, 198, 200 and 60A′ to the lower input connection of stage 150. Thus information denoting the condition of first counting stage 100 is always present at the upper and lower input terminals of memory stage 150, but this information is not passed to the output terminal of stage 150 until a suitable trigger pulse is received over conductor 220. As will become apparent from the subsequent explanation, such pulse is not provided until equality between voltages V1 and V2 is detected. The second counting stage 101 has its upper output terminal coupled over conductor 60B to the upper input connection of second memory stage 151, and the lower output terminal of second counting stage 101 is coupled over conductors 201, 217 and 60B′ to the lower input connection of stage 151 in the memory circuit. Like the previous memory circuit 150, the numerical information present on conductors 60B, 60B′ is not translated to the output circuit of flip-flop stage 151 until an appropriate trigger pulse is received over conductor 220. The information transfer connections between each of the remaining count stages 102–110 and the respective memory circuits 152–160 are analagous, and similar operation with no information being transferred into any of stage 152–160 until the trigger signal is received over conductor 220 is also the same. It is this trigger signal on conductor 220 which passes information from the count circuit 47 (FIGURE 2) through memory circuit 61 and over line 62 to D/A converter 63. This line 62 is represented by the individual output conductors 62A–62K associated with respective memory circuits 150–160 in FIGURE 4.

Although the stages 150–160 have been termed memory stages to indicate their correspondence with the memory unit 61 in FIGURE 2, it is evident that they are really flip-flop circuits. The total count from the last cycle is always available on output conductors 62A–62K of stages 150–160. The operation of comparator 41 is effective, as will be explained, to apply a trigger pulse over conductor 220 which transfers the last full count from stages 100–110 into memory stages 150–160 and from the memory over conductors 62A–62K to D/A converter 63. Such operation differs from the function and operation of gate circuits 130–140, which are actuated or opened each time a count pulse is received from the master oscillator to produce a counting signal over conductor 185 which is effective through inverters 210, 211 to apply a gating pulse over conductor 215 to gate circuits 130–140.

To consider the triggering of memory circuits 150–160, the operation of flip-flop stage 178 in the lower left portion of FIGURE 4 will be considered. Previously the manner in which equality between voltages V1 and V2 produces a negative-going gating pulse which is applied over conductor 177 to the lower input connection of stage 178 was described. After this condition of voltage equality is attained and the signal applied over conductor 177, the next clock or timing pulse received over conductor 24 and translated through stage 180 is passed over conductor 184 to the trigger input terminal of flip-flop stage 178, changing the state of this stage so that at its lower output connection, shown connected over conductor 221 to the upper input connection of inverter gate stage 222, a negative-going or low signal is provided. The other input connection of stage 222 is coupled to ground conductor 165. Stage 222 is another nand circuit and in one embodiment was one-half of a single micrologic circuit which also includes stage 180. Accordingly as the clock pulse is received at the trigger input connection of stage 178 and passed to inverter 222, the voltage level or signal on output conductor 223 goes to a high level. This high level signal is applied to the input portion of a medium power buffer stage 224, which is an inverter amplifier with a high drive capability to provide the appropriate gating signal over its output conductor 225 to the common conductor 220 for simultaneous application to all the flip-flop circuits 150–160 of the memory unit, thereby transferring the count which then appears at the input connections of these memory circuits to the associated D/A converter 63.

The same output signal from stage 224 is also applied over conductor 226 to the trigger input connection of a trigger flip-flop stage 227. The upper and lower input connections of stage 227 are coupled over conductor 228 to the common ground conductor 165. Stage 227 is of the type which changes its state with each signal received over conductor 226, and is effective upon receipt of such a signal to provide a negative-going signal over conductor 230 to the buffer stage 231 which has an output connection coupled to conductor 45. Thus it is evident that a positive-going output pulse is provided from stage 231 over conductor 45 to effect the reset of the counting stages 100–110 within the binary counting circuit represented by the general numeral 47 in FIGURE 2.

All the counting stages are returned to the logic zero state, but some stages exhibit slightly different switching times than do other stages. Some of the stages were probably already in the logic zero condition, in registering the count. To minimize the time duration of the reset pulse, nand gates 187–192 are used to sense that instant when all of the flip-flop stages 100–110 are in the logic zero state. When all the inputs to nand stages 187–192 are in the logic zero condition, a high level signal is passed over conductor 193 to the reset connection of flip-flop stage 227, returning the output level at the lower output connection of stage 227 to the high level and removing the reset pulse from conductor 45.

At the same time that the negative-going signal is provided from the lower output connection of stage 227, a positive-going signal is provided over conductor 229 and applied to the upper input connection of the first stage 232 of a multivibrator circuit which comprises a second stage 233, and stages 232 and 233 are cross-coupled by conductors 234 and 235 in a manner well known in this art. The output connection from stage 232 is coupled not only to conductor 235 but also through resistor 236, to the base 237b of a transistor 237, which also has an emitter 237e, and a collector 237c which is coupled through a resistor 238 to conductor 172. A capacitor 240 is coupled between the collector and emitter of transistor 237. The emitter of unijunction transistor 241 is coupled to the common connection between resistor 238 and capacitor 240. The base two connection of transistor 241 is coupled through a resistor 242 to conductor 172, and the base one connection is coupled through a resistor 243 to the common connection of emitter 237e and capacitor 240. The same base connection is also coupled through another resistor 244 and conductor 245 to the lower input connection of switching stage 233 in the multivibrator circuit.

Prior to receipt of the pulse by stage 232, transistor 237 is conducting and effectively shorting out capacitor 240. Responsive to the receipt of the positive-going pulse over conductor 229, the state of stage 232 is changed and a negative-going signal appears at its output connection and is transferred over resistor 236 to base 237b of transistor 237, switching this transistor off. Simultaneously a positive-going signal is provided at the output connection of stage 233 and passed over conductor 246 as will be explained hereafter.

As transistor 237 is rendered non-conductive, capacitor 240 begins to charge through resistor 238 and, when the appropriate voltage level is applied to the emitter of unijunction transistor 241, this transistor conducts and provides a positive-going signal over resistor 244 and conductor 245 to the lower input connection of stage 233, returning the multivibrator circuit 232, 233 to its original state and allowing transistor 237 to again become conductive and short out capacitor 240.

Before considering the provision of a driving signal over conductors 25A, 25B to an associated static inverter, the energization of this circuit including transistors 248 and 261 will be described. Collector 248c of transistor 248 is coupled over conductor 262 to base 261b of transistor 261, over conductor 262 and diode 263 to the common connection between emitter 261e and resistor 264, and over resistor 258 and conductor 257 to the common connection between collector 261c and collector 250c of transistor 250. Emitter 248e is coupled to ground conductor 165, and the lower connection of resistor 264 is coupled through capacitor 265 and primary winding 266 of transformer 267 to ground conductor 165. A Zener diode 270 is coupled in parallel with primary winding 266 of transformer 267, and secondary winding 268 is coupled to output conductors 25A, 25B.

Emitter 250e is coupled to conductor 172, to which a positive D-C potential is applied at terminal 251. Base 250b is coupled through a four-layer diode 255 and a resistor 253 to a terminal 252, to which a negative D-C potential is applied after the equipment is energized. Resistor 256 is coupled between conductor 172 and the common connection between base 250b and diode 255, and capacitor 254 is coupled between conductor 172 and the common connection between diode 255 and resistor 253.

Those skilled in the art will appreciate that transistor 250, together with its associated components 253–256, constitutes a switching circuit for applying the unidirectional potential appearing on conductor 172 to conductors 257 and 260. This circuit has been provided for operation as a negative potential is applied to terminal 252 approximately 1.2 to 1.5 milliseconds after the system has been energized, thus to prevent the passage of unwanted gating pulses over conductors 25A, 25B until the system has been switched on and stabilized. As soon as the delayed negative potential is applied to terminal 252, capacitor 254 begins to charge through resistor 253. When the level of the charge reaches a predetermined value the four-layer diode 255 breaks down and conducts, forward biasing the base-emitter junction of transistor 250 and rapidly turning this transistor on. For practical purposes this transistor can now be considered a closed switch applying energy to the top of resistor 258 and to collector 261c, conditioning the circuit including transistors 248, 261 for operation when a positive-going signal is applied to the base of transistor 248.

Before this signal was received over resistor 247 and applied to the base of transistor 248, transistor 248 was off or non-conducting and transistor 261 was conducting to complete an obvious charging path for capacitor 265. Responsive to receipt of the positive-going pulse at base 248b, this transistor is rapidly switched on and completes an obvious discharge path over diode 263 for capacitor 265. As this capacitor discharges through the circuit including primary winding 266, a gating pulse is provided across secondary winding 268 and passed over conductors 25A, 25B to the master inverter or the driver for such inverter. Zener diode 270 is provided to prevent the circuit from producing an output pulse of the opposite polarity as the system is returned to its initial state and capacitor 265 is again charged, and diode 270 also effectively limits the amplitude of the output pulse passed over transformer 267.

*Digital-to-analog converter stages*

Figure 5:
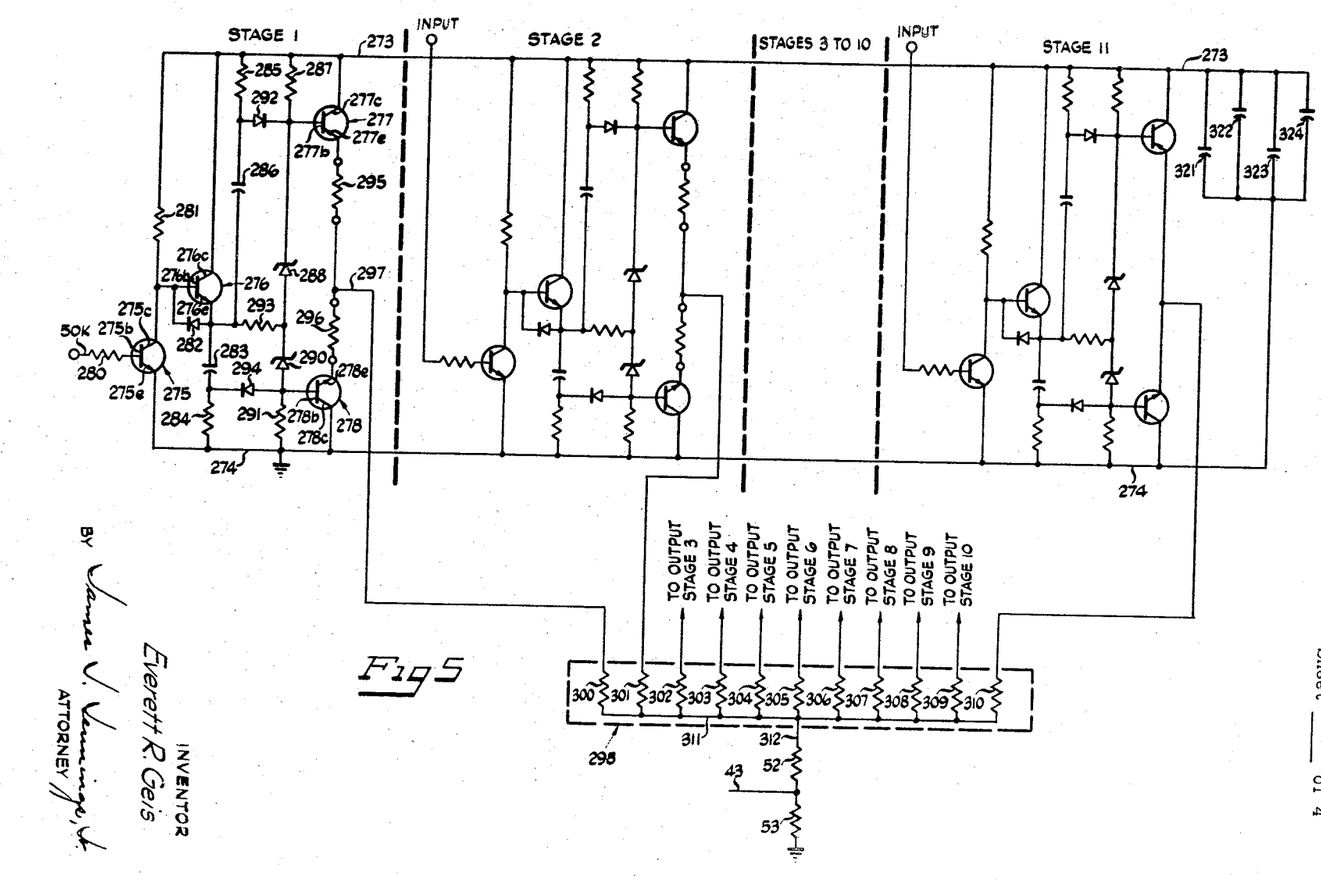
FIGURE 5 is a schematic diagram showing a digital-to-analog converter of the type referenced generally in FIGURE 2.

The digital-to-analog converter circuit shown in FIGURE 5 is suitable for use both as the D/A converter 51, connected between counter 46 and the voltage divider network 52, 53 which provides voltage V2 to the comparator 41 and as the other D/A converter 63 which converts the numerical information received from memory 61 into an analog voltage to provide a signal across voltage divider 64, 15, 66 and pass voltage V3 to the comparator unit 71 of the succeeding stage. By way of specific example the input and output reference numerals will be used to indicate the connection of such a converter to function as D/A converter 51 in FIGURE 2.

Each D/A converter comprises eleven substantially identical stages, of which the first, second, and eleventh are shown in FIGURE 5. Explanation of one stage will provide a basis for understanding the complete converter. The first stage includes four transistors 275, 276, 277 and 278, each having emitter, base and collector elements referenced by $e$, $b$, and $c$, respectively. The transistors 277 and 278, coupled between the positive supply line 273 and the ground conductor 274, are connected to function like a single pole, double throw toggle switch so that conductor 297 is coupled either through the transistor 277 to conductor 273, or is coupled through transistor 278 to conductor 274.

The circuit in stage 1 includes an input conductor 50K for receiving signals from the output conductor similarly referenced in FIGURE 4. A resistor 280 is coupled between conductor 50K and base 275b, and another resistor 281 is coupled between collector 275c and positive conductor 273. The emitter of transistor 275 is coupled to ground conductor 274. Base 276b is coupled to the common connection between resistor 281 and collector 275c, and base 276b is also coupled through a diode 282 to emitter 276e. This emitter is in turn coupled through capacitor 283 and resistor 284 to ground.

In parallel with the collector-emitter path of transistor 276, resistor 285 and capacitor 286 are coupled in a series circuit. Another series circuit comprising a resistor 287, Zener diodes 288 and 290, and resistor 291, is coupled between conductors 273 and 274. A diode 292 has its anode coupled to the common connection between resistor 285 and capacitor 286, and its cathode is coupled to the common connection between resistor 287, diode 288, and base 277b. Resistor 293 has one end coupled to the common connection of capacitors 286 and 283, and the other end coupled between diodes 288, 290. Diode 294 has its cathode coupled between capacitor 283 and resistor 284, and its anode coupled to the common connection between diode 290, resistor 291, and base 278b.

A trimming resistor 295 is coupled between emitter 277e and conductor 297, and a second trimming resistor 296 is coupled between emitter 278e and conductor 297. Conductor 297 provides a circuit connection to one end of resistor 300 in the resistance unit 298, with the other end of resistor 300 being coupled to common conductor 311 and to the output conductor 312. Each of the other resistors 301–310 within resistance unit 298 likewise has one end coupled to the common conductor 311. The individual resistance values for resistors 300–310 are weighted on the binary scale. That is, resistor 300 has a value of 1,000 ohms; resistor 301, 2,000 ohms; resistor 302 has a value of 4,000 ohms; and so on up to resistor 310, which has a value of 1.024 megohms. It is important to the accurate and successful operation of the converter that the total resistance from conductor 311 through resistor 300 and conductor 297 and thence, through either of the two alternate paths 277 or 278, be extremely close to 1,000 ohms; the allowable tolerance is only one-tenth of one percent for this resistor. Accordingly, to provide this precise value, it has proved most practical and economical to make the value of resistor 300 only 998 ohms, and utilize resistance wire as the trimming resistors 295, 296 in the first stage. Similar slight undersizing of resistors 301, 302 is done, and likewise trimming resistors are provided in the second and third stages. Experience has shown that it is not necessary to provide the trimming resistors beyond the third stage and in fact the tolerance of the eleventh stage resistor 310 is plus or minus ten percent.

Capacitors 321–324, shown coupled in parallel between conductors 273 and 274, provide an R-F (radio frequency) noise filter to minimize inadvertent switching of any D/A converter stage by high-frequency transients.

Normally, in the circuit of stage 1 transistors 276 and 278 are conducting, to indicate a logic 0 condition. In this condition common conductor 311 of resistance unit 298 is coupled through resistor 300, conductor 297, trimming resistor 296 and the emitter-collector path of transistor 278 to ground. It is also apparent that capacitor 283 is charged to practically the potential difference appearing between conductors 273, 274 at this time.

Assuming now that a positive-going signal denoting a logic one signal, is received over input conductor 50K, NPN transistor 275 is rapidly switched on, driving the potential at base 276b of transistor 276 toward ground. Current flows from conductor 273 through a path including resistor 287, Zener diode 288, resistor 293, diode 282, and the collector-emitter path of transistor 275 to ground. Capacitor 283 rapidly discharges from the upper plate of this capacitor over diode 282, the collector-emitter path of transistor 275, ground conductor 274 and resistor 284 to the other plate of capacitor 283. This rapid discharge of the capacitor develops a negative-going pulse at the common connection between capacitor 283 and resistor 284, and this sharp pulse is applied through diode 294 to the base of transistor 278, rapidly switching this transistor off. It will be apparent that in the switching cycle, the one of transistors 277, 278 which is being turned off is driven off hard (that is, very fast), while the other one of these two transistors is permitted to "ease on" or become conductive more slowly. Those skilled in the art will appreciate that if transistor 278 were turned off at precisely the same time or slightly later than the time when transistor 277 were turned on, a virtual short circuit would be provided between conductors 273, 274 thus shorting out the power supply.

A short time after transistor 278 is switched off, the voltage developed across resistor 287 is of sufficient amplitude so that the base 277b is more negative than collector 277c and transistor 277 is turned on. Capacitor 286 is charged from conductor 274 over transistor 275, diode 282, the capacitor itself, and resistor 285 to conductor 273.

As the gating pulse on conductor 50K ends with a negative-going portion, transistor 275 is again off, causing base 276b to conduct and raising emitter 276e to a voltage level very nearly equal to that of conductor 273. Capacitor 286 discharges through resistor 285, the capacitor itself, and the collector-emitter path of transistor 276 to conductor 273. The rapid discharge of capacitor 286 provides a positive-going pulse which is applied through diode 292 to the base of transistor 277, turning this transistor off. At a short time thereafter, the potential across resistor 291 drives the base 278b of transistor 278 more positive than collector 278c, and this transistor is turned on to indicate stage one is again in the logic zero condition.

The inverted connection of each of transistors 277 and 278 is important to the rapid, accurate operation of the D/A converter. With this circuit arrangement, each of these transistors exhibits only an extremely low offset voltage, in the order of one to three millivolts, when the transistor is switched on. In addition, when conducting each of these transistors presents a very low equivalent series resistance, less than two ohms. This arrangement sacrifices the usual current gain of the transistor to obtain the extremely low offset voltage and very low series resistance. Thus it is apparent that transistors 277, 278 are operated much like a single pole, double throw switch, and the remainder of the circuitry in stage 1, including transistors 275 and 276 is analogous to an actuator means for changing the position or the state of the switch when a signal is received over conductor 50K.

Figure 6:
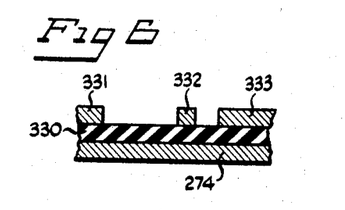
FIGURE 6 is a partial sectional view useful in understanding the physical arrangement of the converter circuit shown in FIGURE 5.

Good circuit performance has been attained by providing the D/A converter circuit on a double-clad circuit board. As shown in FIGURE 6, one conductive side of the board is left intact to provide a ground plane 274, which is shown as a single conductor in FIGURE 5. On the other side of insulating layer 330 (FIGURE 6), the other conductive layer is etched away, leaving conductive portions 331, 332 and 333 as part of the D/A converter circuit.

The illustrated arrangement for the digital-to-analog converter has provided very accurate subdivision of the supply voltage applied between conductors 273 and 274. In one embodiment with a 20-volt D-C supply, the illustrated circuit was effective to provide an analog output voltage in 10 millivolt increments in translating the binary digital information received over input conductors 50A–50K into an analog voltage. It is noted that the output information from the lowest order counting stage in the binary chain is applied over conductor 50A to stage 11, and the highest order binary information is applied over conductor 50K to the input circuit of stage 1.

By way of example only and in no sense by way of limitation, component identification and values for the circuits of FIGURES 4 and 5 will be given, the better to enable those skilled in the art to practice the invention with minimum experimentation. It is initially noted that transformer 267 (FIGURE 4) is available from the Pulse Engineering Company in Santa Clara, Calif., as part number PE4311. Also the resistor unit 298 (FIGURE 5) was provided as a single component, manufactured by the Kelvin Company of Los Angeles, Calif. The part number of this particular component was Kelvin 6513,1364–PN. Circuit values and identification for the other components are set out below:

FIGURE 4.—*Comparator 41 and associated components*

(Conductor 172 at 20 volts D-C (positive) relative to conductor 165)

| Component: | Identification or value |
|---|---|
| 41 | Fairchild 9571031. |
| 183, 224, 231 | Each is a Fairchild FuL90029. |
| 180, 222 | Each is one-half of a Fairchild FuL91429. |
| 178, 227 | Each is Fairchild FuL92629. |
| Resistors 55, 58 | Each 4,000 ohms. |
| Resistors 52, 53 | Each 5,000 ohms. |
| Resistors 171, 174, 175, 176 | Each 1,000 ohms. |
| Resistor 181 | 91 ohms. |
| Potentiometer 56 | 2,000 ohms. |
| Transistor 170 | 2N1309. |
| Diode 168 | 1N756A. |
| Capacitor 161 | 10 microfarads, 25 volts. |
| Capacitor 166 | 500 picofarads. |

Counting and associated components:

| | |
|---|---|
| 100–110 | Each is Fairchild FuL92629. |
| 187–192 | Each is one-half of a Fairchild FuL91429. |
| Capacitor 194 | 100 picofarads. |

Precondition components:

| | |
|---|---|
| 111–128 | Each pair (e.g., 111 and 112) is Fairchild FuL91429. |

Gate and associated components:

| | |
|---|---|
| 131–140 | Each successive pair (e.g., 131 and 132) is Fairchild FuL91429. |
| 210 and 130 | Each is one-half Fairchild FuL91429. |
| 211 | Fairchild FuL90029. |
| Capacitor 213 | 220 picofarads. |

Memory components:

| | |
|---|---|
| 150–160 | Each is Fairchild FuL92629. |

Master inverter pulse circuit:

| | |
|---|---|
| 232, 233 | Each is one-half Fairchild FuL91429. |
| Transistors 237, 248, 261 | Each is 2N3646. |
| Transistor 250 | 2N3638. |
| Transistor 241 | 2N2646. |
| Diode 255 | M4L2054. |
| Diode 263 | IN914. |
| Diode 270 | IN758A. |
| Resistors 236, 247 | Each is 470 ohms. |
| Resistor 238 | 2,400 ohms. |
| Resistor 242 | 620 ohms. |
| Resistor 243 | 100 ohms. |
| Resistor 244 | 1,000 ohms. |
| Resistor 253 | 1,300 ohms. |
| Resistors 256, 258 | Each is 10,000 ohms. |
| Resistor 264 | 120 ohms. |
| Capacitor 240 | 4,700 picofarads. |
| Capacitor 254 | 1.5 microfarads. |
| Capacitor 265 | 1.0 microfarad. |

*FIGURE 5.—Digital to analog converter*

(Conductor 273, 20 volts D-C (positive) relative to conductor 274)

| Component: | Identifications or value |
|---|---|
| Transistors 275, 276 | Each 2N3646. |
| Transistor 277 | 2N1309. |
| Transistor 278 | 2N1308. |
| Diodes 282, 292, 294 | Each 1N914. |
| Diodes 288, 290 | Each 1N963B. |
| Resistor 280 | 220 ohms. |
| Resistors 284, 285 | Each 750 ohms. |
| Resistors 287, 291 | Each 1,500 ohms. |
| Resistor 281 | 2,700 ohms. |
| Resistor 293 | 1,000 ohms. |
| Resistors 295, 296 | Resistance wire. |
| Capacitors 283, 286 | 500 picofarads. |
| Capacitor 321 | 33 microfarads. |
| Capacitors 322, 323 | Each is 0.0047 microfarad. |
| Capacitor 324 | 500 microfarads. |

Summary

The present invention is essentially a period ratio control system, and provides precise regulation of the draw ratios between successive pairs of functions in a processing system. More important, when all the draw ratios are preset before the system is energized, and thereafter it is desired to change only one draw ratio between two successive stations, the present invention makes such a change possible because the other stages automatically correct the motor speeds at the other stations to maintain the preset ratios (other than the draw ratio which was deliberately changed). Previously, in open loop electronic control systems, it has not been possible to modify one draw ratio during system operation without disturbing all the other draw ratios.

Although only a particular embodiment of the invention has been described and illustrated, it is apparent that various modifications and alterations may be made therein. It is therefore the intention in the appended claims to cover all such modifications and alterations as may fall within the true spirit and scope of the invention.

I claim:

1. In a system for supplying periodic energy to a plurality of electrical loads, the energy supplied to different loads having different periods, which system includes a master unit for establishing a reference time period by providing timing pulses at a given periodicity, the improvement which comprises:

a period ratio control system including a plurality of control stages respectively coupled to different ones of said loads, means for applying said timing pulses from said master unit to each of said control stages, period ratio adjusting means coupled to a first one of said control stages for presetting a desired period ratio between a first period corresponding to the period of the output signals from said first control stage with respect to a second period corresponding to the period of the output signals from a second one of said control stages, comparator means, coupled to said period ratio adjusting means and to said second control stage, for comparing a first input signal which is a function of said first period with a second input signal which is a function of said second period, said first input signal being modified in accordance with the setting of said period ratio adjusting means, and means, including said period ratio adjusting means and said comparator means, for regulating the period of the output signals from one of said first and second stages to maintain the preset period ratio without disturbing any other period ratio preset between one of said first and second control stages and a third one of said control stages.

2. In a system for supplying A-C energy to a plurality of electrical loads, the A-C energy supplied to different loads alternating at different frequencies, which system includes a master oscillator for providing timing pulses at a reference frequency, the improvement which comprises:

a frequency ratio control system including a plurality of control stages respectively coupled to different ones of said loads, means for applying the timing pulses from said master oscillator to each of said control stages, frequency ratio adjusting means coupled to a first one of said control stages for presetting a desired frequency ratio between a first frequency corresponding to the frequency of the output signals from said first control stages with respect to a second frequency corresponding to the frequency of the output signals from a second one of said control stages, comparator means, coupled to said frequency ratio adjusting means and to said second control stage, for comparing a first input signal which is a function of said first frequency with a second input signal which is a function of said second frequency, said first input signal being modified in accordance with the setting of said frequency ratio adjusting means, and means, including said frequency ratio adjusting means and said comparator means, for regulating the frequency of the output signals from one of said first and second control stages to maintain the preset frequency ratio without disturbing any other frequency ratio preset between one of said first and second control stages and a third one of said control stages.

3. A system for energizing a plurality of A-C electrical motors with energy of different frequencies to operate the motors at different speeds, which frequencies are referred to a reference frequency established by timing signals supplied from a standard unit, comprising:

a draw ratio control system including a plurality of control stages respectively coupled to different ones of said motors, counter means in each control stage coupled to said standard unit for receiving the timing signals and for providing an output signal related to the number of timing signals received from said standard unit, an adjustable means coupled to the counter means in a first one of said control stages for presetting a desired draw ratio and providing a reference signal related to the preset draw ratio, comparator means, coupled to said adjustable means and to the counter means in a second one of said control stages, for continually comparing said reference signal with said second control stage output signal to provide an output signal from said comparator upon equality between said reference signal and second control stage output signal, and means for utilizing the comparator output signal both to reset said counter means and to apply a driving signal to an associated one of said A-C motors for maintaining the desired draw ratio preset between first and second ones of said A-C motors without disturbing any other draw ratio preset between a third one of said motors and one of said first and second motors.

4. A system for energizing a plurality of A-C electrical motors with energy of different frequencies to operate the motors at different speeds, which frequencies are related to a reference frequency established by timing signals supplied from a master oscillator, comprising:

a draw ratio control system including a plurality of control stages respectively coupled to different ones of said motors, at least one of said control stages including counter means coupled to said master oscillator for receiving the timing signals and for providing an output signal related to the number of timing signals received from said master oscillator, means including a potentiometer connected in a first one of said control stages for presetting a draw ratio and providing a reference signal which is a function of the preset draw ratio, comparator means connected in a second one of said control stages for continually comparing said reference signal with said second control stage output signal to provide an output signal from said comparator means upon detecting equality between said reference signal and the output signal provided by said counter means in said second control stage, and means for utilizing the comparator output signal both to reset said counter means in said second control stage and to regulate application of a driving signal to an associated one of said A-C motors to maintain the draw ratio preset between the motors coupled to said first and second control stages, without disturbing another draw ratio preset between a third one of said control stages and one of said first and second control stages.

5. A system for energizing a plurality of A-C electrical motors to run at different speeds by providing A-C energy at different frequencies to operate the motors, which frequencies are related to a reference frequency established by timing signals supplied from a master oscillator, comprising:

a draw ratio control system including at least first and second draw control stages respectively coupled to different ones of said A-C motors, said second control stage including a counter coupled to said master oscillator for receiving the timing signals and for providing an output signal related to the number of timing signals received from the master oscillator, a potentiometer connected in said first control stage and adjustable for presetting the draw ratio and for providing a reference signal related to the speed of the mtoor associated with said first control stage, a comparator for continually comparing said reference signal with said output signal provided by the counter in said second control stage to provide an output signal from said comparator upon detecting equality between said reference signal and said output signal from the counter in the second control stage, and means for utilizing the comparator output signal both to reset said counter and to apply a driving signal to control the A-C motor associated with said second control stage, thus maintaining the draw ratio preset between the A-C motors coupled to said first and second draw control stages without disturbing the draw ratio preset between another A-C motor coupled to a third one of said draw control stages and one of the A-C motors coupled to said first and second draw control stages.

6. A system for energizing a plurality of A-C electrical motors with energy of different frequencies to operate the motors at different speeds, which frequencies are related to a reference frequency established by timing signals supplied from a master oscillator, comprising:

a draw ratio control system including a plurality of control stages respectively coupled to different ones of said motors, counter means and digital-to-analog converter means for providing an output signal related to the number of timing signals received from said master oscillator, means including a voltage divider arrangement for providing a reference signal, and comparator means for continually comparing said reference signal with the output signal from said converter means to provide a pulse signal responsive to equality between said reference signal and the converter output signal, which pulse signal is applied to said counter means to initiate another sequence of counting the timing pulses received, and which pulse signal is also utilized to control the operation of an associated one of said A-C motors at a speed related to the number of timing pulses received by said counter means before said comparator means provides a pulse signal to reset the counter means.

7. A system for energizing a plurality of A-C electrical motors with energy of different frequencies to operate the motors at different speeds, which frequencies are related to a reference frequency established by timing signals supplied from a master oscillator, comprising:

a draw ratio control system including a plurality of control stages respectively coupled to different ones of said motors, at least one of said control stages including counter means coupled to said master oscillator for registering the number of timing pulses received, digital-to-analog converter means coupled to said counter means for providing an output signal related to the number of timing signals received by said counter means, means for providing a reference signal, and comparator means for continually comparing said reference signal with the output signal from said converter means to provide a pulse signal upon detecting equality between said reference signal and the converter output signal, which pulse signal is applied to said counter means for reset to initiate another sequence of counting as timing pulses are received, and which pulse signal is also applied to regulate the operation of an associated one of said A-C motors at a speed related to the number of timing pulses received in said counter means before said comparator means provides the pulse signal.

8. A system for energizing a plurality of A-C electrical motors with energy of different frequencies to operate the motors at different speeds, which frequencies are related to a reference frequency established by timing signals supplied from a master oscillato,r comprising:
- a draw ratio control system including a plurality of control stages respectively coupled to different ones of said motors, at least one of said control stages including
- counter means coupled to said master oscillator for indicating the number of timing pulses received,
- digital-to-analog converter means coupled to said counter means for providing an output signal the voltage amplitude of which is related to the number of timing signals received by said counter means,
- means for receiving a voltage reference signal from a voltage divider arrangment coupled in another one of said control stages, and
- comparator means in said one control stage for continually comparing said voltage reference signal with the output signal from said converter means to provide a pulse signal upon detecting equality between said reference signal and the converter output signal, which pulse signal is applied to said counter means for reset to initiate another sequence of counting as timing pulses are received, and which pulse signal is also applied to regulate the operation of an associated one of said A-C motors at a speed related to the number of timing pulses received in said counter means before said comparator means providing the pulse signal.

9. A system for energizing a plurality of A-C electrical motors with energy of different frequencies to operate the motors at different speeds, which frequencies are related to a reference frequency established by timing signals supplied from a master oscillator, comprising:
- a draw ratio control system including a plurality of control stages respectively coupled to different ones of said motors, at least a first one of said control stages including
- a counter coupled to said master oscillator for registering the number of timing pulses received,
- a first digital-to-analog converter coupled to said counter for providing an output signal each time a timing pulse is received by said counter, which output signal is related to the number of timing signals registered in said counter,
- means for providing a reference signal,
- a comparator for continually comparing said reference signal with the output signal from said first converter to provide a pulse signal upon detection of equality between said reference signal and the first converter output signal, which pulse signal is applied to said counter as a reset signal to initiate another sequence of counting as timing pulses are received, and which pulse signal is also utilized to regulate the operation of an associated one of said A-C motors at a speed related to the number of timing pulses received in said counter before said comparator provides a reset pulse,
- means, including a second digital-to-analog converter coupled to said counter, for providing an output signal only when said counter is reset to zero, which output signal is related to the total number of timing signals registered in said counter just prior to reset, and
- means for passing at least a portion of said output signal from the second converter to a second one of said control stages for use in maintaining a present draw ratio between a first motor coupled to said comparator and a second motor coupled to said control stage.

10. A system for energizing a plurality of A-C electrical motors with energy of different frequencies to operate the motors at different speeds, which frequencies are related to a reference frequency established by timing signals supplied from a master oscillator, comprising:
- a draw ratio control system including a first control stage coupled to a first one of said motors and a second control stage coupled to a second one of said motors, said first control stage including
- a counter coupled to said master oscillator for registering the number of timing pulses received,
- a first digital-to-analog converter coupled to said counter for providing an output signal each time a timing pulse is received by said counter, which output signal is related to the number of timing signals registered in said counter,
- means for providing a reference signal,
- a comparator for continually comparing said reference signal with the output signal from said first converter to provide a pulse signal upon detection of equality between said reference signal and the first converter output signal, which pulse signal is applied to said counter as a reset signal to initiate another sequence of counting as timing pulses are received, and which pulse signal is also utilized to regulate the operation of said first A-C motor at a speed related to the number of timing pulses received in said counter before said comparator provides a reset pulse,
- means, including a second digital-to-analog converter coupled to said counter, for providing an output signal only when said counter is reset to zero, which output signal is related to the total number of timing signals registered in said counter just prior to reset, and
- means for passing at least a portion of said output signal from the second converter to said second control stage for use in maintaining a preset draw ratio bewteen said first motor and said second motor.

11. A system for enregizing a plurality of A-C electrical motors with energy of different frequencies to operate the motors at different speeds, which frequencies are related to a reference frequency established by timing signals supplied from a master oscillator, comprising:
- a draw ratio control system including a first control stage coupled to a first one of said motors and a second control stage coupled to a second one of said motors, said first control stage including
- a counter coupled to said master oscillator for registering the number of timing pulses received,
- a first digital-to-analog converter coupled to said counter for providing an output signal each time a timing pulse is received by said counter, which output signal is related to the number of timing signals registered in said counter,
- means for providing a reference signal,
- a comparator for continually comparing said reference signal with the output signal from said first converter to provide a pulse signal upon detection of equality between said reference signal and the first converter output signal, which pulse signal is applied to said counter as a reset signal to initiate another sequence of counting as timing pulses are received, and which pulse signal is also utilized to regulate the operation of said first A-C motor at a speed related to the number of timing pulses received in said counter before said comparator provides a reset pulse,
- means, including a second digital-to-analog converter coupled to said counter, for providing an output signal only when said counter is reset to zero, which output signal is related to the total number of timing signals registered in said counter just prior to reset, and means including a voltage divider arrangement with a movable arm for passing at least a portion of said output signal from the second converter to said second control stage for use in maintaining a preset draw ratio between said first motor and said second motor, movement of said arm being effective to vary the preset draw ratio between said motors.

12. A system for energizing a plurality of A-C electrical motors with energy of different frequencies to operate the motors at different speeds, which frequencies are related to a reference frequency established by timing signals supplied from a master oscillator, comprising:

a draw ratio control system including a plurality of control stages respectively coupled to different ones of said motors, each control stage including a counter coupled to said master oscillator for receiving the timing pulses, said counter including a count circuit for registering the number of timing pulses received, a precondition circuit for obviating switching delays, and a gate circuit for providing a digital signal connoting the count then registered in said count circuit upon receipt of a trigger signal by said gate circuit, a first digital-to-analog converter coupled to the gate circuit of said counter for providing an analog voltage output signal each time said digital signal is received from said gate circuit, means for providing a reference voltage signal, a comparator for continually comparing said reference voltage signal with said analog voltage output signal to provide a pulse signal upon detection of equality between the amplitudes of said reference voltage signal and the first converter analog voltage output signal, which pulse signal is applied to said count circuit as a reset signal to initiate another sequence of counting as timing pulses are received, and which pulse signal is also utilized to regulate the operation of an associated A-C motor at a speed related to the number of timing pulses received in said counter before said comparator provides a reset pulse, a memory circuit coupled to said count circuit and operable responsive to receipt of a trigger pulse just prior to reset of the count circuit to provide a digital signal denoting the count registered in said count circuit, a second digital-to-analog converter coupled to said memory circuit, for providing a substantially constant output voltage signal related in amplitude to the total number of timing signals registered in said count circuit just prior to reset, and means including a voltage divider with an adjustable tap for passing at least a portion of the output voltage signal from the second converter to another one of said control stages for maintaining a preset draw ratio between two of said motors, with movement of the adjustable tap being effective to correspondingly change the preset draw ratio.

13. In a motor control system in which at least three A-C motors are operated at different speeds in accordance with preset draw ratios between the successive motors, each of said motors being coupled individually to a separate inverter for energization in accordance with the frequency of the inverter output to voltage, with all of said motors being operated at a frequency related to a reference frequency determined by the output signal from a master oscillator, a draw ratio control system comprising:

a first digital draw ratio control stage, coupled between said master oscillator and the inverter associated with the first motor, including draw ratio adjusting means operable to determine the draw ratio between said first and second motors, a second digital draw ratio control stage, coupled between said master oscillator and the inverter associated with the second of said motors, including draw ratio adjusting means operable to determine the draw ratio between the second and third motors, and a third digital draw ratio control stage, coupled between said master oscillator and the inverter associated with said third motor, said draw ratio control stages being operative to maintain either of said draw ratios notwithstanding a change in the other of said draw ratios.

References Cited

UNITED STATES PATENTS

| 3,178,624 | 4/1965 | Border | 318—67 |
| 3,064,173 | 11/1962 | Breen et al. | 318—77 X |
| 3,118,097 | 1/1964 | Hettler | 318—77 X |

FOREIGN PATENTS

| 745,840 | 3/1956 | Great Britain. |
| 869,334 | 5/1961 | Great Britain. |

BENJAMIN DOBECK, *Primary Examiner.*

B. A. COOPER, *Assistant Examiner.*

U.S. Cl. X.R.

318—68, 70, 78

UNITED STATES PATENT OFFICE
CERTIFICATE OF CORRECTION

Patent No. 3,447,050 May 27, 1969

Everett R. Geis

It is certified that error appears in the above identified patent and that said Letters Patent are hereby corrected as shown below:

Column 19, line 4, "oscillato,r" should read -- oscillator --; line 30, "providing" should read -- provides --; line 68, "present" should read -- preset --. Column 20, line 39, "enregizing" should read -- energizing --. Column 22, line 14, cancel "to".

Signed and sealed this 21st day of April 1970.

(SEAL)
Attest:

Edward M. Fletcher, Jr.
Attesting Officer

WILLIAM E. SCHUYLER, JR.
Commissioner of Patents